(12) United States Patent
Krellner et al.

(10) Patent No.: US 9,136,764 B2
(45) Date of Patent: Sep. 15, 2015

(54) APPARATUSES AND SYSTEM AND METHOD FOR AUTO-CONFIGURATION OF A POWER CONTROL SYSTEM

(75) Inventors: Jan Krellner, Laguna Niguel, CA (US); Stephen Ulbrich, Anaheim Hills, CA (US); Kenneth Kwok, Irvine, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 184 days.

(21) Appl. No.: 13/451,360

(22) Filed: Apr. 19, 2012

(65) Prior Publication Data

US 2013/0278234 A1    Oct. 24, 2013

(51) Int. Cl.
| | |
|---|---|
| G05F 1/577 | (2006.01) |
| H02M 3/158 | (2006.01) |
| G05F 1/00 | (2006.01) |
| H02M 1/44 | (2007.01) |
| H02M 3/156 | (2006.01) |

(52) U.S. Cl.
CPC .............. H02M 3/1584 (2013.01); *H02M 1/44* (2013.01); *H02M 2003/1566* (2013.01)

(58) Field of Classification Search
CPC .......... H02M 3/1584; H02M 3/33515; H02M 2001/008; H02M 2003/1586; H02M 3/156; H02M 3/33561
USPC .......... 323/265–268, 271–272, 282–285, 318
See application file for complete search history.

(56) References Cited

U.S. PATENT DOCUMENTS

| | | | |
|---|---|---|---|
| 5,353,215 A | * | 10/1994 | Dinwiddie et al. ............. 363/65 |
| 6,788,035 B2 | | 9/2004 | Bassett et al. |
| 7,224,592 B2 | | 5/2007 | Chou et al. |
| 7,342,383 B1 | * | 3/2008 | Song et al. ..................... 323/222 |
| 7,453,251 B1 | | 11/2008 | Mehas et al. |

(Continued)

FOREIGN PATENT DOCUMENTS

KR    10-0881500    2/2009

OTHER PUBLICATIONS

Linear Technology, "LTC3731 3-Phase, 600 kHz, Synchronous Buck Switching Regulator Controller," data sheet, 2003, pp. 1-32, Linear Technology Corporation, Milpitas, California.

(Continued)

*Primary Examiner* — Adolf Berhane
*Assistant Examiner* — Henry Lee, III
(74) *Attorney, Agent, or Firm* — Traskbritt (57) ABSTRACT

Power control systems and power control devices may include a power control chip having a power control module configured to generate a power stage control signal, and an external power stage having a timing control module. The timing control module may be configured to receive the power stage control signal and generate a timing control signal controlling at least one switch to regulate an output voltage of the external power stage. The power control device further includes an auto-configuration module configured to communicate with the external power stage and request auto-configuration information from the external power stage. A related method of auto-configuring a power control system includes communicating auto-configuration information between at least one external power stage of a power control system and a power control chip, and configuring a setting of the at least one external power stage of the power control system based on the auto-configuration information.

28 Claims, 6 Drawing Sheets

FIG. 2

(56) References Cited

U.S. PATENT DOCUMENTS

| | | |
|---|---|---|
| 7,456,617 B2 | 11/2008 | Chapuis et al. |
| 7,518,894 B2 * | 4/2009 | Fosler et al. .................... 363/72 |
| 7,793,005 B1 * | 9/2010 | Fernald et al. .................... 710/3 |
| 8,330,439 B2 | 12/2012 | Wu |
| 8,467,157 B2 | 6/2013 | Gaknoki et al. |
| 2004/0041543 A1 | 3/2004 | Brooks et al. |
| 2004/0136208 A1 | 7/2004 | Agarwal et al. |
| 2005/0073288 A1 * | 4/2005 | Harris ........................... 323/282 |
| 2006/0052905 A1 * | 3/2006 | Pfingsten et al. ............. 700/286 |
| 2006/0244570 A1 * | 11/2006 | Leung et al. ............. 340/310.11 |
| 2006/0279969 A1 * | 12/2006 | Leung et al. .................... 363/41 |
| 2007/0030716 A1 * | 2/2007 | Manolescu ..................... 363/84 |
| 2008/0218155 A1 | 9/2008 | Huang et al. |
| 2009/0153110 A1 | 6/2009 | Huang |
| 2010/0001705 A1 | 1/2010 | Takahashi |
| 2010/0225287 A1 | 9/2010 | Schultz |
| 2010/0231183 A1 | 9/2010 | Jan et al. |
| 2011/0198926 A1 * | 8/2011 | Xu et al. ......................... 307/38 |
| 2011/0283130 A1 | 11/2011 | Pai et al. |
| 2013/0057239 A1 | 3/2013 | Kalje et al. |
| 2013/0265022 A1 | 10/2013 | Ulbrich et al. |

OTHER PUBLICATIONS

Intersil, "ISL6336, ISL6336A, 6-Phase PWM Controller with Light Load Efficiency Enhancement and Current Monitoring," data sheet, Intersil Americas, Inc., May 28, 2009, pp. 1-31.

Intersil, "ISL6617, PWM Doubler with Phase Shedding Function and Output Monitoring Feature," data sheet, Intersil Americas, Inc., Feb. 4, 2010, pp. 1-15.

PCT International Search Report and Written Opinion of the International Searching Authority for PCT/US20131036893 dated Jul. 12, 2013, 8 pages.

PCT International Search Report and Written Opinion of the International Searching Authority for PCT/US2013/035248, dated Jul. 25, 2013, 13 pages.

* cited by examiner

APPARATUSES AND SYSTEM AND METHOD FOR AUTO-CONFIGURATION OF A POWER CONTROL SYSTEM

CROSS REFERENCE TO RELATED APPLICATION

This application is related to U.S. patent application Ser. No. 13/441,747, entitled "Apparatuses and System Having Separate Power Control and Timing Control of a Power Control System and Related Method," filed Apr. 6, 2012, pending, the disclosure of which is hereby incorporated by reference in its entirety.

FIELD

Embodiments of the present disclosure relate generally to power control systems and, more particularly, to apparatuses, systems and methods for auto-configuration of a power control system.

BACKGROUND

Figure 1:
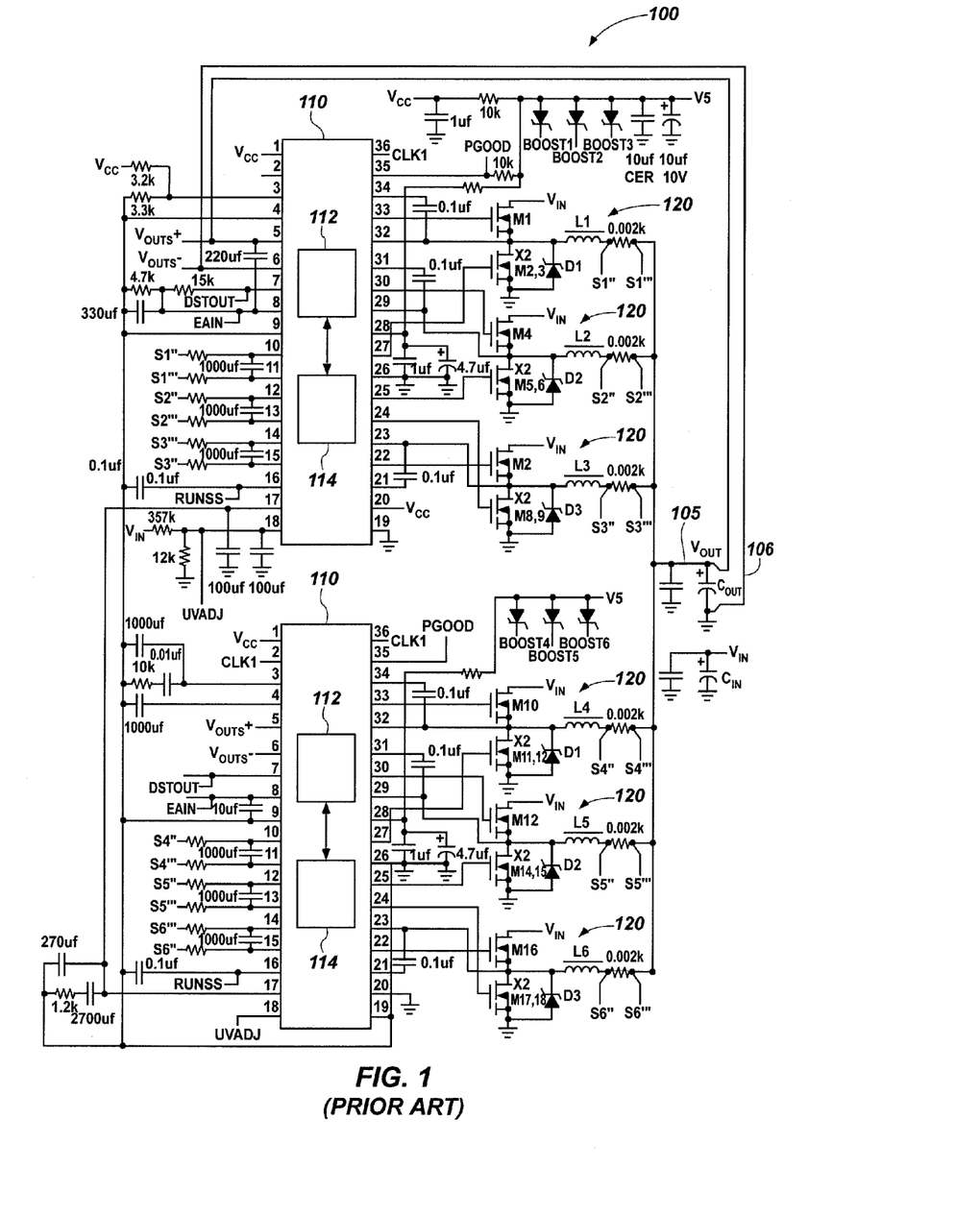
FIG. 1 is a schematic diagram of a conventional power control system.

Power control systems regulate voltages that are often used to provide power to devices, systems, and sub-systems of a variety of electronic systems. FIG. 1 is a schematic diagram of a conventional power control system 100. The power control system 100 includes a pulse-width-modulation (PWM) controller 110 operably coupled with one or more switching converters 120 to operate as a switching regulator. As shown in FIG. 1, the switching converter 120 may include one or more circuit elements to regulate a voltage and generate an output voltage ($V_{OUT}$) 105. For example, the top right switching converter 120 is shown to include a plurality of transistors (M1, M2) operably coupled with a diode (D1), an inductor (L1) and a capacitor (Cout) in a buck configuration. The other switching converters 120 of the plurality may include circuit elements that are similarly configured, and which are shown to have similar designations. For simplicity, the operation of the PWM controllers 110 will be described only with respect to the top right switching converter 120; however, the other switching converters 120 may have a similar operation.

The PWM controller 110 includes a power control module 112 and a timing control module 114 that are conventionally co-located together. "Co-location" of the power control module 112 and the timing control module 114 means that the power control module 112 and the timing control module 114 are physically located on the same semiconductor die and/or within the same package. For example, the power control module 112 and the timing control module 114 may be formed on different semiconductor dice, yet still may be defined as being co-located if housed within the same package. As a result, at least some of the interconnections between the power control module 112 and the timing control module 114 may be internal connections within the package.

The power control module 112 may be configured to perform the voltage regulation loop function of the power control system 100. For example, the PWM controller 110 may have a pin (labeled as pin "5") that receives an output voltage 105 of the power control system 100 as a feedback signal. The PWM controller 110 may include another pin (labeled as pin "6") that receives a ground voltage 106. The voltage difference between the output voltage 105 and the ground voltage 106 is understood by the PWM controller 110 to be the regulated voltage coupled to a load (not shown). The output voltage 105 and the ground voltage 106 may be input into the PWM controller 110 to a unity-gain differential amplifier (not shown) configured for remote sensing of the positive and negative load terminals. The output (DIFFOUT) from the internal differential amplifier may be an output voltage feedback signal that is output from pin "7" to a voltage divider. From the voltage divider, a portion of the DIFFOUT signal may be input into pin "8" of the PWM controller 110. The input signal (EAIN) through pin 8 may be input to an internal comparator (not shown) of the PWM controller 110 for comparison to an internal reference voltage.

The result of the comparison of the EAIN signal and the internal reference voltage may be transmitted to the timing control module 114, which is configured to determine the duty cycle timing for the switching converter 120. In particular, the PWM controller 110 generates timing signals (PWM signals) that are output from the PWM controller 110 through pins "33" and "27." The timing signals drive the gates of transistors (M1, M2) at the proper duty cycle to regulate the output voltage 105 to the desired voltage. The PWM controller 110 may further include current sense feedback signals ($S1^+$, $S1^-$) that monitor the current flowing through the inductor (L1) to further control the output current. These current sense feedback signals may be input to the timing control module 114 such that the timing control module 114 generates the timing signals to have a duty cycle based largely on the result of the comparison of the EAIN signal and the internal reference signal, as well as the current sense feedback signals.

BRIEF SUMMARY

Embodiments of the present disclosure may include a power control device. The power control device comprises a power control module configured to generate a power stage control signal indicating an offset between and output voltage and a reference voltage, and to externally transmit the power stage control signal to an external power stage having a timing control module that is physically separate from the power control module. The power control device further comprises an auto-configuration module configured to communicate with the external power stage and request auto-configuration information from the external power stage.

Embodiments of the present disclosure may include a power control device. The power control device may comprise a timing control module configured to receive a power stage control signal from a power control chip having a power stage control module that is physically separate from the timing control module, and to generate a timing control signal that controls a duty cycle for a voltage converter responsive to the power stage control signal. The power control device further comprises an auto-configuration module configured to receive an auto-configuration request from the power control chip and respond to the request.

Embodiments of the present disclosure may include a power control system. The power control system may comprise a power control chip having a power control module configured to generate a power stage control signal, and at least one external power stage configured to receive the power stage control signal and provide a regulated current to a load. Each of the power control chip and the at least one external power stage include auto-configuration modules configured to communicate auto-configuration information therebetween.

Embodiments of the present disclosure may include a method of auto-configuring a power control system. The method may include communicating auto-configuration information between at least one external power stage of a power control system and a power control chip, and configuring a setting of the at least one external power stage of the power control system based on the auto-configuration information.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the claimed invention is defined only by the appended claims and their legal equivalents.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

The design of an electronic device may contribute to the adjustment of the power requirements from a power control system. Such changes usually result in the demand for increased power densities, which may further result in a re-design of one or more of the components of the power control system. These changes affecting the power requirements of the electronic device may occur late in the design process, which may add expense and delays to the design of the power control system. In addition, as conventional power control systems include power control modules and timing control modules that are co-located, the inventors have appreciated that such may contribute to an increasing problem of "hot spots" in the power control system. In addition, referring again briefly to FIG. 1, when conventional power control systems 100 include a plurality of switching converters 120, each of the switching converters 120 may include timing signals from different of pins of the PWM controller 110. Similarly, for current mode regulators each of the switching converters 120 may transmit current sense feedback signals to different pins of the PWM controller 110. Thus, increasing the number of power stages may contribute significantly to increasing the number of pins required by the PWM controller 110. As a result, a relatively large number of power stages may not be practical given size constraints of the PWM controller 110.

Embodiments of the present disclosure may include power control systems that include physical separation of the power control module and the timing control module. Such separation may contribute to reducing the effects of hot spots by distributing the heat load at locations throughout the physical system. Embodiments of the present disclosure may further allow changes in the design process to be relatively easier by moving the generation of the timing signals to the separate chips associated with the power stages, such that the additional power stages may simply be added or subtracted based on the power requirements without having to reconfigure the entire power control loop. In addition, embodiments of the present disclosure may reduce the number of package pins (e.g., digital pins and analog pins) from the regulating power control loop package in comparison to conventional power control systems. Reducing the number of package pins may result in a smaller package and also contribute to the reduction of undesirable interference to certain sensitive analog signals. Further embodiments may include auto-configuring the components of the power control system such that the number and other characteristics and information are known throughout the power control system.

Figure 2:
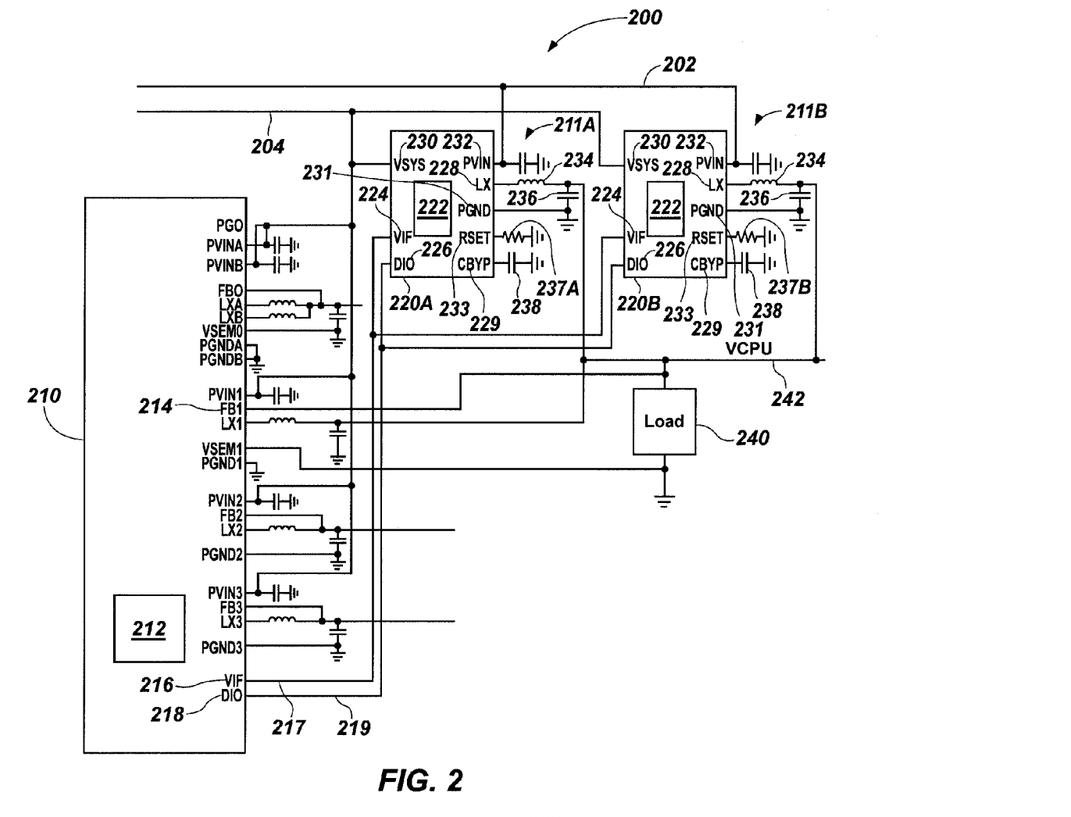
FIG. 2 is a schematic block diagram of a power control system according to an embodiment of the present disclosure.

FIG. 2 is a schematic block diagram of a power control system 200 according to an embodiment of the present disclosure. The power control system 200 includes a power control chip 210 operably coupled with one or more power stages 211A, 211B. The power control system 200 may be configured to generate an output voltage 242 to be regulated to a desired voltage (e.g., 1V, 2V, etc.) according to the voltage requirements of a load 240. The load 240 may be a device, system, or sub-system of an electronic system. For example, the output voltage 242 may be a power supply for a microprocessor. Thus, the output voltage 242 is also designated in FIG. 2 as "VCPU." In some embodiments, the load 240 and the output voltage 242 may be for a different device, system, or sub-system of an electronic system.

The output voltage 242 may be set by the power control system 200 to a particular desired voltage regardless of the current drawn by the load 240. For example, the power stages 211A, 211B may be controlled to supply a current to the load 240 while the voltage may remain the same. Thus, a number of power stages 211A, 211B may be provided to achieve a particular current for the load, according to the power requirements of the load 240. In FIG. 2, two power stages 211A, 211B are shown; however, it should be appreciated that any number of power stages 211A, 211B may be operably coupled with the power control chip 210.

Each power stage 211A, 211B may include a timing control chip 220A, 220B for controlling the operation of a switching converter. The switching converter may include components such as an inductor 234 and a capacitor 236 that are coupled with one or more switches (not shown) and configured as a voltage converter. Such components configured as a voltage converter may be configured as part of switching regulator (e.g., a current mode regulator, voltage mode regulator). For example, the components may be configured as one of a buck converter, a boost converter, a buck-boost converter, etc. depending on the desired effect. Other types of converters, regulators, and other configurations are also contemplated for which the timing signals may be generated. In addition, as shown in FIG. 2, the power stages 211A, 211B may be configured as a voltage controlled current source (VCCS). However, other embodiments may include power stages 211A, 211B that are configured as a current controlled current source (CCCS), a voltage controlled voltage source (VCVS) or a current controlled voltage source (CCVS).

In this embodiment shown in FIG. 2, the one or more switches of the power stage 211A, 211B may be integrated within the same package of the respective timing control chips 220A, 220B. Other components of the power stage 211A, 211B may also be integrated within the respective timing control chips 220A, 220B. As will be discussed with respect to FIG. 3, the one or more switches of the power stage 211A, 211B may be external to the respective package of the timing control chips 220A, 220B.

Referring again specifically to FIG. 2, the power control chip 210 includes a power control module 212 configured to perform the power control loop function of the power control system 200. The power control module 212 may receive the output voltage 242 that is to be regulated to a desired voltage. Thus, the output voltage 242 may also have a feedback path to the power control chip 210 and be received at a feedback pin 214 (also labeled "FB1"). The power control module 212 may receive the output voltage 242 and compare the output voltage 242 (or at least another voltage derived from or dependent on the output voltage 242) with a reference voltage to determine power stage control information. The power stage control information may be represented as a power stage control signal 217 (e.g., voltage) that indicates an offset (if any) between the output voltage 242 and a desired voltage for the output voltage 242. The power stage control signal 217 may be transmitted to an external component through a pin 216 (also labeled "VIF") of the power control chip 210. Additional detail regarding the power stage control signal 217 will be described below. The power control chip 210 may include additional pins having additional functionality that may contribute to the operation of the electronic system, but which may not be as pertinent as the power control and timing features of the power control system 200.

Each timing control chip 220A, 220B includes a timing control module 222 configured to generate the timing control signals for control of the respective power stage 211A, 211B. Each timing control chip 220A, 220B may receive the power stage control signal 217 from the power control chip 210 through a pin 224 (also labeled "VIF"). The timing control module 222 of each timing control chip 220A, 220B may include control logic (e.g., through hardware, software, etc.) that is configured to generate the timing signals responsive to the received power stage control signal 217. The timing signals may be control signals transmitted to one or more switches (not shown), such that the duty cycle of the timing signals is determined (i.e., based at least in part) by the received power stage control signal 217. In FIG. 2 the one or more switches are not shown as they are assumed to be integrated within the package of the timing control chip 220A, 220B. The output from the one or more switches may be transmitted externally from the timing control chip 220A, 220B through an output pin 228 (also labeled "LX"), which may be received by the other components of the voltage converter (e.g., inductor 234, capacitor 236) of the power stage 211A, 211B to generate the regulated output voltage 242. The timing control chips 220A, 220B may include additional pins having additional functionality that may contribute to the operation of the electronic system, but which may not be as pertinent as the power control and timing features of the power control system 200. For example, power input pins 230 (also labeled "VSYS"), 232 (also labeled "PVIN") may receive a system voltage 204 and a battery voltage 202, respectively. Input pin 231 (also labeled "PGND") may receive a reference (e.g., ground) for the feedback path and the output voltage 242. Input pin 229 (also labeled "CBYP")

may be coupled with an optional bypass capacitor 238 for the internal voltage regulator of the timing control chips 220A, 220B. Additional input pins 226 (also labeled "DIO") and 233 (also labeled "ID") may be configured for auto-configuration of the power stages 211A, 222B, as will be described in more detail below.

As discussed above, the power control chips 210 and the timing control chips 220A, 220B are physically separate from each other. In other words, the power control module 212 and the timing control module 222 are not co-located with each other. As described above, co-location is defined as being either on the same silicon die and/or located within the same package. Therefore, in contrast to conventional power control systems, the power control module 212 and the timing control module 222 are physically separate from each other. By having the power control module 212 and the timing control module 222 physically separated, the timing control module 222 may be moved to different locations of an electronic system. In addition, a power control system 200 that has a plurality of power stages may include timing control chips 220A, 220B (each having a timing control module 222) that are distributed and mounted at various locations on a printed circuit board (PCB) (e.g., motherboard) that is physically separated from the power control chip 210 (having the power control module 212).

By being described as physically separated from each other, it is not to be implied that a particular distance between the power control module 212 and the timing control module 222 is required. For example, in some embodiments the power control module 212 and the timing control module 222 may have a relatively small distance therebetween (e.g., less than an inch). In some embodiments, the power control module 212 and the timing control module 222 may have a relatively large distance therebetween (e.g., 10 inches). As a result, the effect of hot spots may be reduced as the power control chip 210 and the timing control chips 220A, 220B are mounted at different locations on a printed circuit board (e.g., motherboard).

The power control system 200 may include any number of power stages 211A, 211B. For example, some embodiments of the present disclosure may include a single power stage 211A, while other embodiments may include a plurality of power stages 211A, 211B, . . . 211$_N$. The plurality of power stages 211A, 211B may be coupled in parallel with each other as remote distributed devices. The number of power stages 211A, 211B may not affect the output voltage 242; however, having a plurality of power stages 211A, 211B may increase the overall power by increasing the current. Thus, the overall power requirement of the load 240 may guide the number of power stages 211A, 211B included in the design of the power control system 200.

The power stage control signal 217 may be an analog signal. In some embodiments, the power stage control signal 217 may be converted to a digital signal with an analog to digital controller (ADC) to be transmitted in the digital domain to the timing control module 222. The power stage control signal 217 may be a common signal received by each timing control chip 220A, 220B for each power stage 211A, 211B of the power control system 200. In response to each of the timing control chips 220A, 220B receiving the power stage control signal 217, the timing control module 222 may generate the appropriate timing signals for regulating the output voltage 242. Because the power stages 211A, 211B generate their own timing control signals, in contrast to conventional power control systems, the number of pins needed by the power control chip 210 may be reduced. For example, a single pin 216 may send a single power stage control signal 217 that is common to each of the power stages 211A, 211B as opposed to having multiple pins dedicated to transmitting different timing signals for different power stages. As a result, the size of the power control chip 210 may be reduced.

In addition, by locating the timing control module 222 within the power-stage stages 211A, 211B, local current sense feedback signals of the power stages 211A, 211B may also not be required to be fed back to the power control chip 210. As discussed above, such local current sense feedback signals may be sensed for the operation of a current mode voltage regulator. As a result, the pins (e.g., pins labeled 10 through 15 in FIG. 1) of conventional power control systems that are associated with the current sense feedback signals may be eliminated from the power control chip. Referring again to FIG. 2, such local current sense feedback signals are not shown, but may be measured internally to the timing control chips 220A, 220B. As a result, the size of the power control chip 210 may be further reduced, in addition to simplifying the routing of wires between the power control chip 210 and the power stages 211A, 211B, particularly for systems that include a relatively large number of power stages 211A, 211B.

In some embodiments, the power stage control signal 217 may also be a modulated signal. For example, the power stage control signal 217 may be modulated (e.g., amplitude modulation, frequency modulate, phase modulation, etc.). Such modulation may result in the power stage control signal 217 having an improved noise immunity. For example, as the power stage control signal 217 may be a direct analog signal, transmitting such a signal over a PCB with many high-speed switching nodes may result in unwanted interference onto the power stage control signal 217. Modulating the power stage control signal 217 may limit interference to a particular band, which may result in an improved noise immunity and permit even further distances between the power control chip 210 and the timing control chips 220A, 220B.

In addition, modulation of the power stage control signal 217 may enable additional information to be transmitted along with the power stage control information. For example, clock synchronization information may be embedded with the power stage control information. In other words, a plurality of different information types (e.g., power stage control information, clock synchronization information) may be transmitted together through the same pin 216. As a result, additional information may be transmitted without adding an additional pin to both the package of the power control chip 210 and the timing control chip 220A, 220B. Clock synchronization may include clock information for a master clock. Thus, when the timing control module 222 receives the power stage control signal 217 to determine its own timing control signals for its power stage 211A, 211B, switching the switches on and off may occur according to a switching frequency and/or duty cycle, and also in a manner that is synchronized to the master clock. As a result, the timing signals for each of the power stages 211A, 211B may be synchronized to the master clock. The clock synchronization information may also be used by a plurality of power stages 211A, 211B to synchronize their timing signals with the master clock in the sense that a certain phase offset may be maintained relative each other, with the phase offset still being governed by the master clock.

The power control system 200 may be configured for auto-configuration between the power control chip 210 and the power stages 211A, 211B. The power control chip 210 and the power stages 211A, 211B may communicate with each other. For example, the power control chip 210 may further be configured to communicate with the timing control chips 220A, 200B via an auto-configuration signal 219. Thus, each of the power control chip 210 and the timing control chips 220A, 200B may send or receive the auto-configuration signal 219 depending on the direction of communication at the time. For example, the auto-configuration signal 219 may be communicated between a pin 218 (also labeled "DIO") of the power control chip 210 and a pin 226 (also labeled "DIO") of the timing control chip 220A, 220B. The auto-configuration signal 219 may be a digital signal, with the connection between the DIO pins 218, 226 being a digital channel (e.g., a single wire).

The configuration information may include power stage information indicating the presence of individual power stages 211A, 211B coupled with the power control chip 210. The power stage information may further identify unique identifications (IDs) corresponding to each of the timing control chips 220A, 220B of the power stages 211A, 211B. The power control chip 210 may automatically receive such configuration information during start up, which may be used determine the number of power stages 211A, 211B that are in the power control system 200, their corresponding IDs, and other related configuration information.

As an example of determining the number of power stages 211A, 211B of the power control system 200, the power control chip 210 may send an ID request via the auto-configuration signal 219. The ID request may include a request for each of the power stages 211A, 211B of the power control system 200 to respond and identify their presence to the power control chip 210. The response from the different power stages 211A, 211B may also indicate the unique IDs for each of the timing control chips 220A, 220B. As an example, each of the timing control chips 220A, 220B may have a unique ID associated therewith. For example, each timing control chip 220A, 220B may be coupled to a resistor 237A, 237B having a unique resistance used to determine the desired ID for that timing control chip 220A, 220B. In other words, the first timing control chip 220A may be coupled with the first resistor 237A having a first resistance, while the second timing control chip 220A may be coupled with the second resistor 237B having a second resistance that is unique from the first resistance. Each of the timing control chips 220A, 220B may determine its own unique ID based on a determination of the value of the corresponding resistor 237A, 237B. Other examples of assigning unique IDs to the timing control chips 220A, 220B are contemplated, at least some of which are described below.

The ID request from the power control chip 210 may provide for a time window for each timing control chip 220A, 220B to respond according to the corresponding ID. For example, the ID request may designate the device assigned to ID "0" to respond during a first time window, the device assigned to ID "1" to respond during a second time window, and so on. As a result, each of the timing chips do not respond at the same time through the same auto-configuration line. After all time windows have lapsed, the power control chip 210 may be aware of the IDs and total number of timing control chips that responded. In the same request, or a different request, the power control chip 210 may request additional configuration information regarding each of the timing control chips 220A, 220B of the power control system 200. For example, the power control chip 210 may request the current gain rating for each of the timing control chips 220A, 220B. In some embodiments, the first timing control chip 220A and the second timing control chip 220B (and other timing control chips) may each supply the same current (e.g., 4A) to the load 240, which information is communicated to the power control chip 210 individually from each timing control chip 220A, 220B. In some embodiments one or more of the timing control chips 220A, 220B may supply different current levels (e.g., 4A, 6A, etc.).

Communication requests from the power control chip 210 may be device specific, in that the power control chip 210 requests information from a specific timing control chip by sending a specific unique ID for the desired responding device. As a result, although each timing control chip 220A, 220B may receive the communication request, only the one assigned to that unique ID may respond. Communication requests from the power control chip 210 may also be general for all devices of the power control system 200, in that the power control chip 210 requests information from each timing control chip and providing a time window for each to respond according to their unique ID numbers.

The power control chip 210 may send system information to each of the timing control chips 220A, 220B of the power control system 200. For example, the power control chip 210 may inform each of the timing control chips 220A, 220B of the total number of timing control chips 220A, 220B in the power control system 200, as well as other information such as current gain ratings, IDs, and telemetry data for the various timing control chips 220A, 220B of the power control system 200.

From this information, each of the timing control chips 220A, 220B may adjust their own operation. For example, in a multiphase system where each of the timing control chips 220A, 220B provide currents to the load 240 that are out of phase with each other, such information may be used to determine its phase relative to the synchronization signal and its own unique ID. As an example, in a power control system 200 that includes two timing control chips 220A, 220B, each timing control chip 220A, 220B may be aware that there are two timing control chips. In addition, each timing control chip 220A, 220B may be aware of its own unique ID (e.g., ID0, ID1). As a result, when the timing control chips 220A, 220B receive clock synchronization information from the power control chip 210, the timing control chip (e.g., 220A) having ID0 may generate an output in phase with the synchronization signal, while the timing control chip (e.g., 220B) having ID1 may generate an output that is 180 degrees out of phase with the synchronization signal. For power control systems 200 having even more timing control chips, the timing control chips may further calculate the out-of-phase offset and its position to generate outputs that have smaller offsets. The phase offset is thus determined by each timing control chip 220A, 220B locally based on the total number of timing control chips of the power control system 200, and their position (unique ID) among them. The phase offset between the timing control chips 220A, 220B may evenly spaced from each other.

As a result, performing such auto-configuration of the power control system 200 during a start up mode may enable designers to add or subtract power stages from the final design without a costly re-configuration (e.g., re-design, re-programming, etc.) of the power control chip 210 even if the power requirements change for a particular rail or for the overall system. For example, for conventional systems that are limited on the number of power stages based on the number of output pins correspond to a power stage. However, embodiments of the disclosure may essentially connect as many power stages 211A, 211B to the VIF pin 224 as there are assigned unique IDs. As an example, sixteen power stages may be supportable through a single pin rather than sixteen pins (or sets of pins). Thus, the power stages 211A, 211B may simply include plug and play devices (e.g., timing control chips 220A, 220B) that may be added or subtracted late in the design process if power requirements for the overall system change. Each of the devices become aware of what other devices are in the power control system 200, as well how to configure themselves in response to such information in order to perform the desired loop control operation for a desired loop bandwidth.

The auto-configuration signal 219 may also be used to communicate configuration information between the power control chip 210 and the timing control chips 220 during operation. For example, such characteristic configuration information that is characteristic of each individual devices of the power stages 211A, 211B, such as voltage or current thresholds and other information that may be used to alter system behavior (e.g., set current limits, gain settings, etc.).

The auto-configuration signal 219 may also be used during start up and regular operation to communicate fault information of the power control system 200. For example, configuration information may include fault information indicating a fault condition of the power control system 200. A fault condition may include the connection between the VIF pins 216, 224 carrying the power stage control signal 217 may be shorted. Thus, if either of the power control chip 210 or the timing control chips 220A, 220B detects a short, a remedial action may be taken, such as ceasing power generation. Other fault conditions may be detected, such as if a timing control chip 220A, 220B does not respond to a communication request.

Another example of information that may be communicated with the auto-configuration signal 219 is telemetry data of the timing control chips 220A, 220B during operation. Telemetry data may include operating temperature, operating current, voltage, power, and other operating parameters.

Because each of the timing control chips 220A, 220B are coupled with each other on the same line, in some embodiments the timing control chips 220A, 220B may be configured to communicate information with each other directly rather than through the power control chip 210.

Auto-configuration between the power control chip 210 and the timing control chips 220A, 220B may also enable external power phases to be enabled and disabled according to present current demands for different modes of operation. For example, during an idle mode, a microprocessor may require less current (e.g., 1A) than during a normal mode of operation (e.g., 10A). As a result, the power control chip 210 may send a disable command to a particular power stage 211A, 211B to shut off current from that particular power stage. As described herein, the power control chip 210 may be aware of the current rating and unique ID for each timing control chip 220A, 220B. As a result, if the current load requirement is reduced by 8 A during an idle mode, the power control chip 210 may use the unique IDs to temporarily disable the regulation from one or more timing control chips 220A, 220B that would otherwise have produced an additional 8 A current. If the current load requirement increases, the one or more timing control chips 220A, 220B may be again enabled for regulation and generating the desired current. Thus, the power control chip 210 may adaptively and automatically adjust the output power of the power control system 200 according to present current demands.

Figure 3:
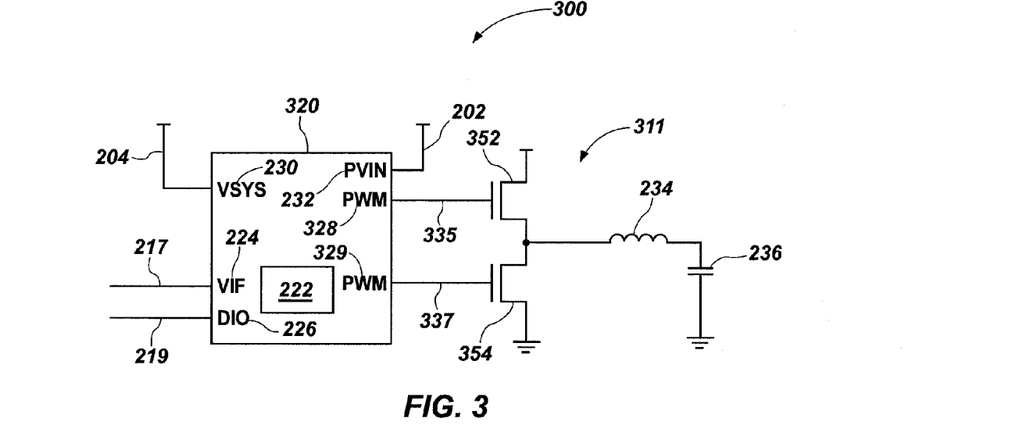
FIG. 3 is a schematic diagram of a portion of a power control system according to an embodiment of the present disclosure.

FIG. 3 is a schematic diagram of a portion of a power control system 300 according to an embodiment of the present disclosure. In particular, FIG. 3 shows a power stage 311 of the power control system 300. The power stage 311 may be one of a plurality of power stages that are coupled to a power control chip, which is not shown in FIG. 3, but may be configured similarly to the power control chip 210 of FIG. 2. As shown in FIG. 3, the power stage 311 may include a timing control chip 320. The timing control chip 320 may include a timing control module 222 that is configured substantially similar to that described above. For example, the timing control module 222 may receive the power stage control signal 217 and generate timing control signals 335, 337 in response thereto. In contrast with FIG. 2, one or more switches 352, 354 may be separate from the timing control chip 320. For example, the switches 352, 354 may be discrete transistors coupled with the inductor 234 and capacitor 236 to operate as a voltage converter. Thus, the timing control chip 320 may be configured as a gate driver for the switches 352, 354. The timing control signals 335, 337 may be PWM signals transmitted to the switches 352, 354 through pins 328, 329 (also labeled "PWM").

Figure 4:
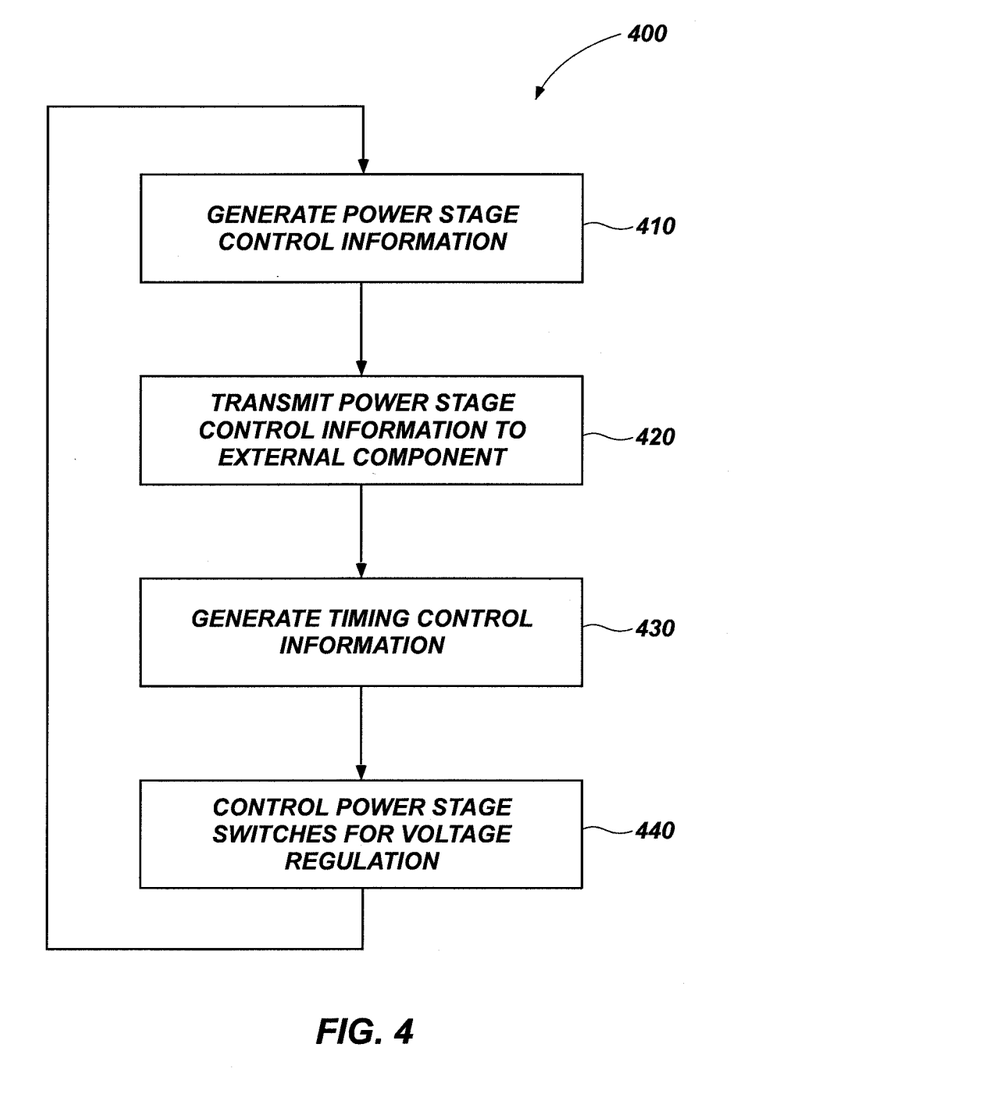
FIG. 4 is a flow chart illustrating a method for power control of a power control system according to an embodiment of the present disclosure.

FIG. 4 is a flow chart 400 illustrating a method for power control of a power control system according to an embodiment of the present disclosure. At operation 410, power stage control information may be generated. For example, a feedback signal from an output voltage may be received by a power control chip and compared with a reference voltage. The power stage control information may indicate an offset (if any) between the output voltage and a desired voltage for the output voltage.

At operation 420, the power stage control information may be transmitted to an external component of the power control system. For example, the power stage control information may be transmitted as a power stage control signal to a timing control chip of a power stage of the power control system. The power stage control signal may be an analog signal, and may further be modulated to improve noise immunity and/or to include additional information for the power stage. For example, the power stage control signal may be modulated to include clock synchronization information to operate the power stages according to a master clock.

At operation 430, timing control information may be generated responsive to the power stage control information, such as within a timing control module of the timing control chip. The timing control module may be physically separate from a power control module of the power control chip that generates the power stage control information. The timing control information may indicate a duty cycle for one or more power stage switches.

At operation 440, the power stage switches may be controlled according to timing signals generated according to the timing control information to achieve voltage regulation of the output voltage to have a desired voltage. Such an output voltage may be provided to a load, such as a microprocessor, or other device, system, or sub-system of an electronic system. The output voltage may be fed back to the power control chip as a closed loop for adjusting and maintaining the output voltage at the desired level.

Figure 5:
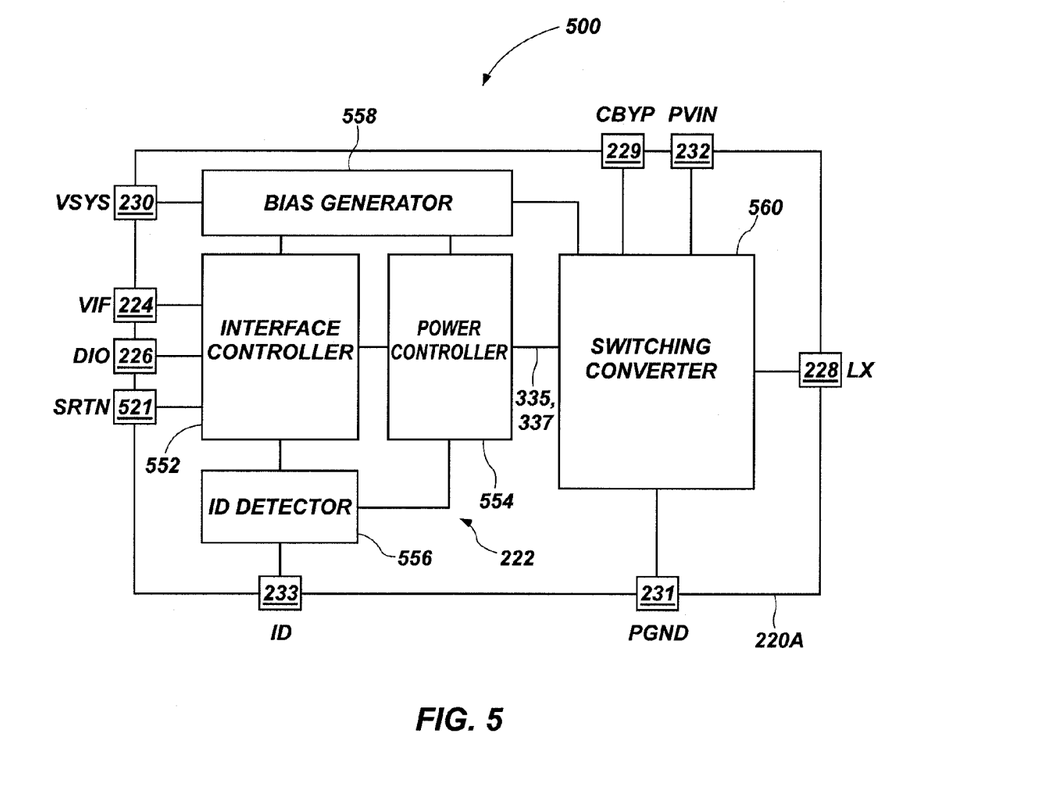
FIG. 5 is a schematic block diagram of a portion of a power control system according to an embodiment of the present disclosure.

FIG. 5 is a schematic block diagram of a portion of a power control system 500 according to an embodiment of the present disclosure. In particular, FIG. 5 shows a timing control chip 220A that may be coupled with a power control chip 210 and configured generally similar to that described with reference to FIG. 2. The timing control chip 220A may include a timing control module 222 coupled with a switching converter 560. As discussed above, the timing control module 222 may receive the power stage control signal 217 and generate timing control signals 335, 337 in response thereto in order to control the switching converter 560 to regulate an output voltage to the load 240 (FIG. 2). As also discussed above, the switching converter 560 may be housed within the package of the timing control chip 220A such that the output through the output pin 228 is output to an RC circuit (e.g., inductor 234, capacitor 236 of FIG. 2) for regulating the output voltage. In some embodiments, the timing control chip 220A may be a gate driver for an external regulator chip or discrete transistors 352, 354 (FIG. 3) coupled with the inductor 234 and capacitor 236 to operate as a voltage converter.

As discussed above, such components configured as a voltage converter may be configured as part of switching regulator (e.g., a current mode regulator, voltage mode regulator). For example, the components may be configured as one of a buck converter, a boost converter, a buck-boost converter, etc. depending on the desired effect. Other types of converters, regulators, and other configurations are also contemplated for which the timing signals may be generated. In addition, as described above, the power stages 211A, 211B may be configured as a VCCS, CCCS, VCVS, or CCVS.

As shown in FIG. 5, the timing control module 222 may include an interface controller 552, a power controller 554, an ID detector 556, and a bias generator 558. The timing control module 222 may be operably coupled to the switching converter 560, and to input pins 224, 226, 230, 233, and 521 to receive input signals to perform the various functions described herein.

The ID detector 556 is configured to determine the unique ID for the timing control chip 220A. As discussed above, the ID detector 556 may be configured to automatically determine the ID for the timing control chip 220A during power startup of the power control system 500 (e.g., when a voltage is present on VSYS 230 and/or PVIN 232). The power control chip 210 (FIG. 2) may send a configuration request to the timing control chip 220A (and other timing control chips) via an auto-configuration signal 219 (FIG. 2) received through the DIO pin 226.

For example, the ID detector 556 may be coupled to a resistor 237A (FIG. 2) through the ID pin 233. As discussed above, each timing control chip of a power control system may be coupled to a different resistor having a different resistance associated with a unique ID for that timing control chip 220A. For example, the designer may couple the ID pin 233 of the first timing control chip 220A to the first resistor 237A having a first resistance (e.g., 1 k Ohm). The first resistance may be associated with a first ID ($ID_0$). The designer may further couple the ID pins of additional timing control chips to different resistors having a second different resistances (e.g., 2 k Ohm, 3 k Ohm, etc.) associated with unique IDs.

In operation, the each of the ID detector 556 may force a current through the resistor 237A. The ID detector 556 may sense the voltage across the resistor 237A to determine the value of the resistor 237A and the associated ID for that resistor value. For example, the ID detector 556 may include an ADC that measures and converts the sensed voltage to a digital signal. The ID detector 556 may further include control logic (e.g., state machine, lookup table, etc.) that decodes the sensed voltage to determine the unique ID for the timing control chip 220A. Thus, the number of timing control chips 220A, 220B, etc. may be essentially limited by the number of unique IDs recognizable and available to the timing control chips 220A, 220B, rather than by physical constraints of pins of the power control chip 210.

In some embodiments, the resistor 237A may be replaced with another circuit element, such as a capacitor, for assigning unique IDs to the timing control chip 220A through the ID pin 233 and the ID detector 556. In another embodiment, the ID detector 556 may determine the unique ID from a plurality of pins that receive input signals rather than measuring a resistor value. For example, the ID detector 556 may be coupled to three pins that each receive an input signal (e.g., either a high signal or a low signal), such that a digital code (e.g., 000, 001, 010, etc.) may be provided to the ID detector 556 to assign one of eight different IDs to the timing control chip 220A. For a power control system 500 with more than eight power stages, more than three pins may be coupled with the ID detectors 556 to provide additional combinations of digital codes.

In another embodiment, the unique ID may be set based on a programmable component assigning the timing control chip 220A with the unique ID. For example, a fuse cell may be blown to provide a specific configuration for a unique ID. In another embodiment, the timing control chip 220A may include a unique ID stored in an internal memory (e.g., EPROM, EEPROM, etc.) that may be requested by the power control chip 210 during startup.

The bias generator 358 may be configured to provide internal power supplies to the various internal components of the timing control chip 220A. For example, the bias generator 358 may include one or more internal voltage regulators that generate internal reference voltages, bandgap voltage, reference currents, etc. for the timing control chip 220A.

The interface controller 552 is configured to receive and convert the power stage control signal 217 from the power control chip 210 for a further determination of the timing control signals 335, 337 that control the switching converter 560. The interface controller 552 may be further configured to receive and process the clock synchronization information to generate an internal clock for the timing control chip 220A. For example, the interface controller 552 may include a PLL that locks to the frequency of the clock synchronization information to generate the internal clock. As described above, with knowledge of the total number of timing control chips and the unique ID of the timing control chip 220A relative the others, the timing control chip 220A may determine the proper phase shift from the incoming signal for embodiments where the timing control chips provide currents having different phases. The clock synchronization information received from the power stage control signal 217 may also be used to determine when to sample the auto-configuration signal 219 for determining and decoding the information received from the auto-configuration signal 219.

The power controller 554 may be configured to control the sequencing of the timing control chip 220A during the different modes of operation. For example, the power controller 554 may determine when and how to detect the unique ID, when to and how to read the communication from the communications received from the power control chip 210, when and how to respond to the power control chip 210, when and how to generate the timing control signals 335, 337 that control the switching converter 560. For example, the power controller 554 may be configured to as a state machine or other control logic.

The signal return (STRN) pin 521 may receive a reference voltage (e.g., ground) to the interface controller 552 to provide the timing control chip 220A a common reference with the power control chip 210 for the power stage control signal 217 and the auto-configuration signal 219. Having such a common reference signal with the power control chip 210 and the timing control chip 220A may reduce interference between the two chips during load transients.

Figure 6:
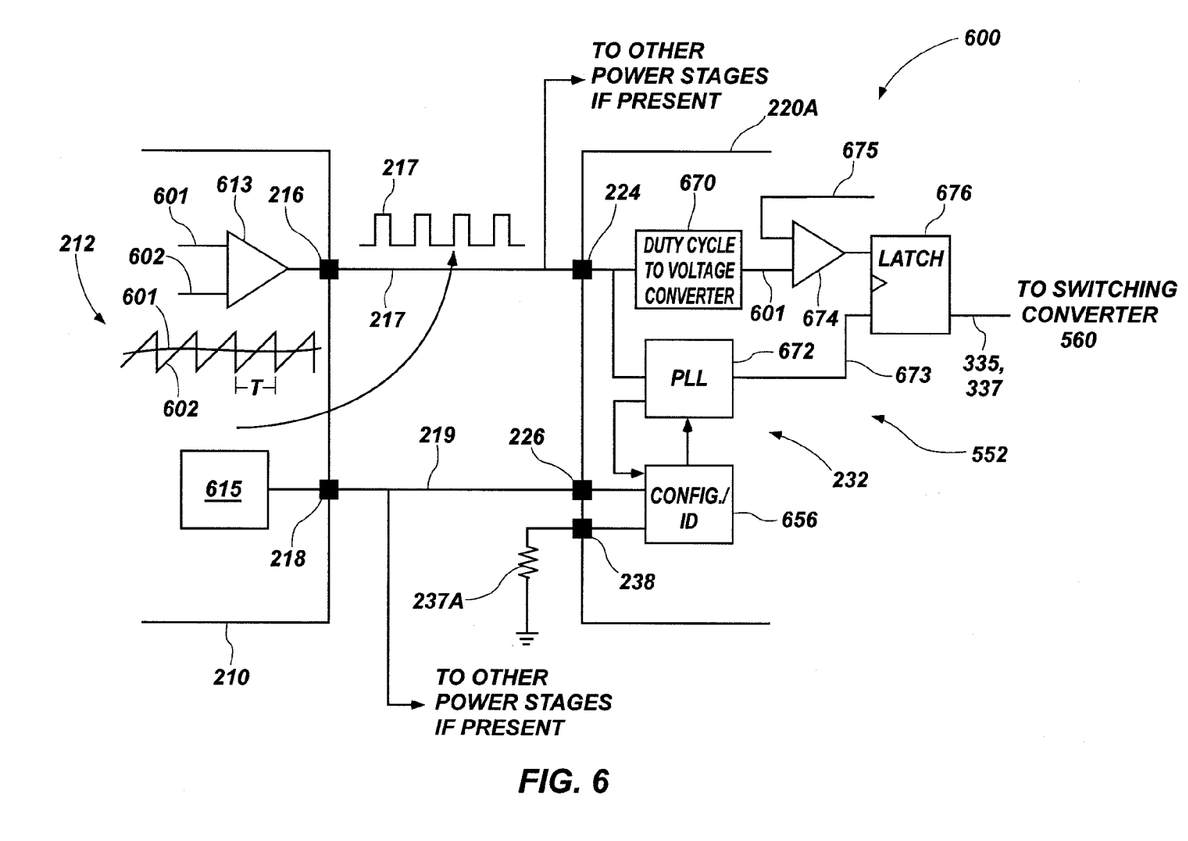
FIG. 6 is a schematic block diagram of a power control system according to an embodiment of the present disclosure.

FIG. 6 is a schematic block diagram of a power control system 600 according to an embodiment of the present disclosure. The power control system 600 may include a power control chip 210 and at least one timing control chip 220A of a power stage, each of which may be generally configured as discussed above. The power control chip 210 may include the power control module 212, which may generate the power stage control signal 217 (e.g., voltage) that indicates an offset (if any) between the output voltage and a desired voltage for the output voltage. As discussed above, the power stage control signal 217 may be transmitted to the timing control chip 220A as an analog signal or a digital signal, and may further be a modulated signal. As an example of generating such a digital signal, the power control module 212 may include a comparator 613 that receives a loop filter voltage signal 601 to compare with a ramp voltage signal 602. The ramp voltage signal 602 may be a saw tooth wave having a period (T) and a frequency (f=1/T). The output of the comparator 613 may be the power stage control signal 217 having the frequency of the ramp voltage signal 602. For such an embodiment, the duty cycle of the power stage control signal 217 may contain the information for generating the timing control signals 335, 337 because the duty cycle changes based on the fluctuations of the loop filter voltage signal 601. The frequency of the power stage control signal 217 may be the clock synchronization information used for clocking the operations of the timing control chip 220A and generating any phase offset (if desired for the particular embodiment) depending on the unique ID and number of power stages in the power control system 600.

The power control module 212 may further include an auto-configuration management module 615. The auto-configuration management module 615 communicates with the timing control chip 220A for sending configuration requests, requests for telemetry information, unique device IDs, etc. The auto-configuration management module 615 further receives the responses from the timing control chip 220A.

The timing control chip 220A includes the timing control module 222, which may receive the power stage control signal 217 (e.g., voltage) used to generate the timing control signals 335, 337 for the switching converter 560 (FIG. 5). For an embodiment where the duty cycle of the power stage control signal 217 includes the control loop information indicating offset (if any) of the output voltage, the timing control module 222 may include a duty cycle to voltage converter 670 configured to detect the duty cycle of the power stage control signal 217 and generate a corresponding voltage—essentially demodulating the power stage control signal to again obtain the loop filter voltage signal 601. The loop filter voltage signal 601 may be compared with a sense signal 675 by a comparator 674 to generate the timing control signals 335, 337 for the switching converter 560.

A PLL 672 may receive the power stage control signal 217 and generate an internal reference clock for the timing control chip 220A. A latch 676 may be used to latch the timing control signals 335, 337 to have the desired phase according to the unique ID and number of other timing control chips. For example, the PLL 672 may receive information regarding the number of timing control chips and unique ID from a configuration/ID module 656. The PLL 672 may provide a switching signal 673 having the desired switching frequency, but which may be offset in phase from the other timing control chips. The switching frequency of the switching signal 673 may be derived from the frequency of the power stage control signal 217.

The configuration/ID module 656 may be configured to communicate auto-configuration information with the power control chip 210 and detect the unique ID for the timing control chip 220A as discussed above.

Figure 7:
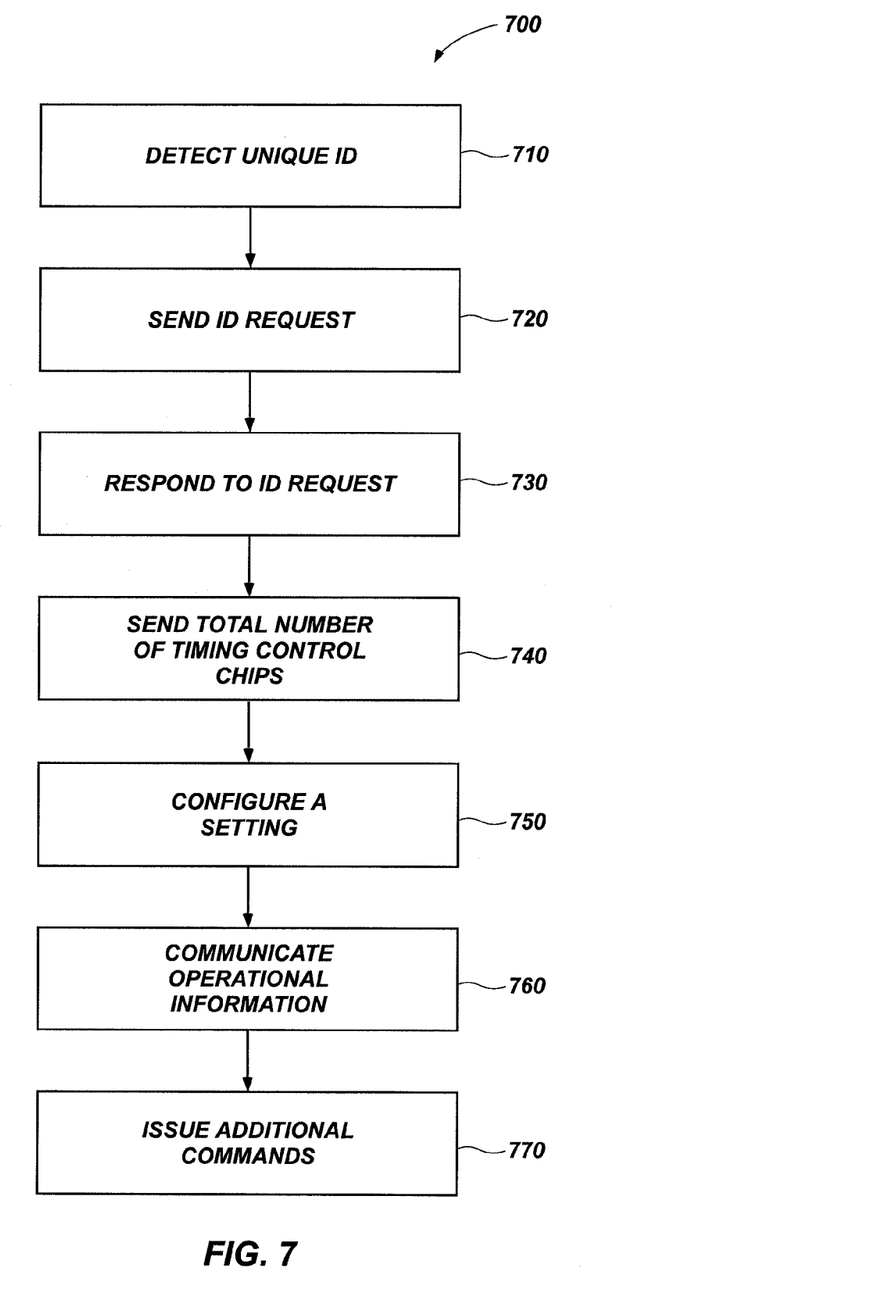
FIG. 7 is a flow chart illustrating a method for auto-configuration of a power control system according to an embodiment of the present disclosure.

FIG. 7 is a flow chart 700 illustrating a method for auto-configuration of a power control system according to an embodiment of the present disclosure. At operation 710, each timing control chip may detect a unique ID assigned to its external power stage. The unique identification may be detected by a determination of a unique resistor, capacitor, digital signal, programmed ID, among other methods. At operation 720, the power control chip may send an ID request via the auto-configuration signal to each of the timing control chips of the power control system. At operation 730, the timing control chips may respond to the power control chip indicating their unique ID. For example, the timing control chips may respond during a time window associated with their unique ID so that the power control chip associates that timing control chip with the proper unique ID. The timing control chips may also provide additional information regarding the configuration of the timing control chip, such as its current rating or other configuration or performance information.

At operation 740, the power control chip may send the total number and IDs of the timing control chips of the power control system. At operation 750, the timing control chip may configure a setting based on the auto-configuration information. For example, the individual timing control chips may calculate a phase offset from a master clock for the timing control signals to a switching converter based on the unique ID and the known total number of external power stages of the power control system. Such configuration may be performed during a start up mode of the power control system. At operation 760, operational information (e.g., telemetry data) may be communicated via the auto-configuration signal. For example, the operational information may be sent between the timing control chips and the power control chip, and/or timing control chips themselves. At operation 770, other commands may be issued from the power control chip to the timing control chips. For example, the power control chip may send a digital code to at least one external power stage to disable the at least one external power stage during an idle mode. During a return to a normal operation mode, the power control chip may send a digital code to at least one external power stage to enable the at least one external power stage. The auto-configuration signal may also be used for communicating other information and for other determinations, such as fault determination within the power control system.

While the present disclosure has been described herein with respect to certain illustrated embodiments, those of ordinary skill in the art will recognize and appreciate that the disclosure is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor. Finally, the scope of the claimed invention is defined only by the appended claims and their legal equivalents.

What is claimed is:

1. A power control device, comprising:
   a power control module configured to generate a power stage control signal indicating an offset between an output voltage and a reference voltage, and to externally transmit the power stage control signal to an external power stage having a timing control module that is physically separate from the power control module, the output voltage generated by the external power stage to power a load; and
   an auto-configuration module configured to communicate with the external power stage and request auto-configuration information from the external power stage.

2. The power control device of claim 1, further comprising a power control chip including:
   the power control module;
   a first output pin through which the power stage control signal is transmitted; and a second output pin through which communication between the auto-configuration module and the external power stage is transmitted and received.

3. The power control device of claim 2, wherein the auto-configuration module is configured to generate an identification request to the external power stage requesting a unique identification from the external power stage.

4. The power control device of claim 2, wherein the auto-configuration module is configured to generate an identification request to a plurality of external power stages requesting a unique identification from each of the plurality of external power stages.

5. The power control device of claim 4, wherein the identification request includes a digital code requesting the plurality of external power stages to respond during a time window assigned to their unique identification.

6. The power control device of claim 2, wherein the auto-configuration module is configured to generate a telemetry data request to the external power stage requesting operational parameters from the external power stage.

7. The power control device of claim 1, further comprising:
a voltage converter; and
the external power stage including a timing control chip configured to:
receive the power stage control signal and generate a timing control signal to control a duty cycle for the voltage converter; and
receive an identification request from the auto-configuration module and responsively send a response to the auto-configuration module.

8. A power control device, comprising:
a timing control module configured to:
receive a power stage control signal from a power control chip having a power stage control module that is physically separate from the timing control module; and
generate timing control signals having a duty cycle that are provided to switches to control a duty cycle for a voltage converter that generates a power signal to a load responsive to the power stage control signal; and
an auto-configuration module configured to receive an auto-configuration request from the power control chip and respond to the request.

9. The power control device of claim 8, wherein the auto-configuration module include an identification detector configured to detect a unique identification for the power control device.

10. The power control device of claim 9, wherein the identification detector comprises control logic configured to decode a characteristic of the power control device to determine the unique identification.

11. The power control device of claim 10, wherein the characteristic includes a resistance of a resistor coupled with the identification detector.

12. The power control device of claim 11, wherein the control logic includes at least one of a state machine and a lookup table configured to assign the resistance with the appropriate unique identification.

13. The power control device of claim 9, wherein the auto-configuration module is further configured to calculate a phase offset for the timing control signal based on a known number of external power stages of a power control system and the unique identification for the power control device.

14. The power control device of claim 9, wherein the auto-configuration module is further configured to respond to requests for current gain information from the power control chip.

15. A power control system, comprising:
a power control chip having a power control module configured to generate a power stage control signal; and
at least one external power stage having a timing control module that is separate from the power control module, the at least one external power stage configured to receive the power stage control signal and provide a regulated current to a load, wherein each of the power control chip and the at least one external power stage further include auto-configuration modules configured to communicate auto-configuration information therebetween.

16. The power control system of claim 15, wherein the at least one external power stage includes a plurality of external power stages each configured to receive the power stage control signal as a common signal and provide a regulated current to the load.

17. The power control system of claim 16, wherein the auto-configuration modules of each external power stage of the plurality communicate with the auto-configuration module of the power control chip through a common digital input/output (DIO) signal.

18. The power control system of claim 17, wherein each external power stage of the plurality has a unique identification associated therewith.

19. The power control system of claim 18, wherein the power control chip is configured to transmit the common DIO signal with a code for each of the external power stages of the plurality to respond according to their unique identifications.

20. The power control system of claim 18, wherein the power control chip is configured to transmit the common DIO signal with a code for one of the external power stages of the plurality to respond according to its unique identification.

21. The power control system of claim 18, wherein the power control chip is configured to transmit the common DIO signal with a code for at least one external power stage of the plurality to be disabled.

22. The power control system of claim 18, wherein each external power stage is configured to adjust its configuration settings based at least in part on its knowledge of a number of total external power stages of the plurality and its own unique identification.

23. A method of auto-configuring a power control system, the method comprising:
communicating auto-configuration information between at least one external power stage of a power control system and a power control chip, the at least one external power stage including a timing control module that is physically separate from a power control module of the power control chip; and
configuring a setting of the at least one external power stage of the power control system based on the auto-configuration information.

24. The method of claim 23, wherein communicating auto-configuration information includes communicating information indicating a presence of a number of external power stages in the power control system.

25. The method of claim 23, wherein communicating auto-configuration information includes communicating a unique identification for the at least one external power stage.

26. The method of claim 25, wherein communicating auto-configuration information includes responding to a request for the unique identification during a defined time window assigned to the unique identification.

27. The method of claim 25, wherein configuring a setting of the at least one external power stage includes calculating a phase offset from a master clock for timing control signals for a switching converter based on the unique identification and a known total number of external power stages of the power control system.

28. The method of claim 25, wherein configuring a setting of the at least one external power stage includes disabling the at least one external power stage during an idle mode.

* * * * *